(12) United States Patent
Toyoda et al.

(10) Patent No.: US 9,123,179 B2
(45) Date of Patent: Sep. 1, 2015

(54) SURROUNDING IMAGE DISPLAY SYSTEM AND SURROUNDING IMAGE DISPLAY METHOD FOR VEHICLE

(75) Inventors: Heishiro Toyoda, Toyota (JP); Toshihiro Hattori, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 104 days.

(21) Appl. No.: 13/822,452

(22) PCT Filed: Sep. 2, 2011

(86) PCT No.: PCT/IB2011/002031
§ 371 (c)(1),
(2), (4) Date: Mar. 12, 2013

(87) PCT Pub. No.: WO2012/035390
PCT Pub. Date: Mar. 22, 2012

(65) Prior Publication Data
US 2013/0176329 A1    Jul. 11, 2013

(30) Foreign Application Priority Data
Sep. 15, 2010    (JP) .................................. 2010-206794

(51) Int. Cl.
G09G 5/00    (2006.01)
G06T 11/60    (2006.01)
G06T 11/00    (2006.01)

(52) U.S. Cl.
CPC ................. *G06T 11/60* (2013.01); *G06T 11/00* (2013.01); *G06T 11/001* (2013.01); *G06T 2207/30261* (2013.01)

(58) Field of Classification Search
USPC ......................................................... 345/629
See application file for complete search history.

(56) References Cited

U.S. PATENT DOCUMENTS

| 5,270,688 A | 12/1993 | Dawson et al. |
|---|---|---|
| 2008/0285799 A1 | 11/2008 | Chiu et al. |
| 2009/0102858 A1 | 4/2009 | Eggers et al. |
| 2012/0296523 A1* | 11/2012 | Ikeda et al. ..................... 701/41 |
| 2012/0314074 A1* | 12/2012 | Aimura et al. ................ 348/148 |

FOREIGN PATENT DOCUMENTS

| DE | 102006012773 A1 | 11/2006 |
|---|---|---|
| DE | 202006010960 U1 | 2/2007 |

(Continued)

OTHER PUBLICATIONS

Ikeda et al., JP Publication No. 2011-151479, filing date Jan. 19, 2010, translation by JPO, pp. 1-16.*

(Continued)

*Primary Examiner* — M Good Johnson
(74) *Attorney, Agent, or Firm* — Sughrue Mion, PLLC

(57) ABSTRACT

A surrounding image display system (1, 2) equipped for a vehicle includes a processing unit (10, 12) that is connected to a camera (20, 22) that captures an image around the vehicle. The processing unit (10, 12) processes the captured image from the camera (20, 22) to recognize an attention object, and generates a display image in which a frame border (70) that at least partially surrounds the recognized attention object is superimposed on the captured image. The frame border (70) includes a first frame border portion (72) drawn in a first color and a second frame border portion (74) drawn in a second color different from the first color.

9 Claims, 12 Drawing Sheets

(56) References Cited

FOREIGN PATENT DOCUMENTS

| | | |
|---|---|---|
| JP | 07-222027 A | 8/1995 |
| JP | 2003-284057 A | 10/2003 |
| JP | 2004-173048 A | 6/2004 |
| JP | 2004-325977 A | 11/2004 |
| JP | 2007-159036 A | 6/2007 |
| JP | 2008-022348 A | 1/2008 |
| JP | 2009-040108 A | 2/2009 |
| JP | 2011151479 A * | 8/2011 |
| WO | 2010/024969 A1 | 3/2010 |

OTHER PUBLICATIONS

International Search Report for corresponding International Patent Application No. PCT/IB2011/002031 mailed Dec. 22, 2011.

* cited by examiner

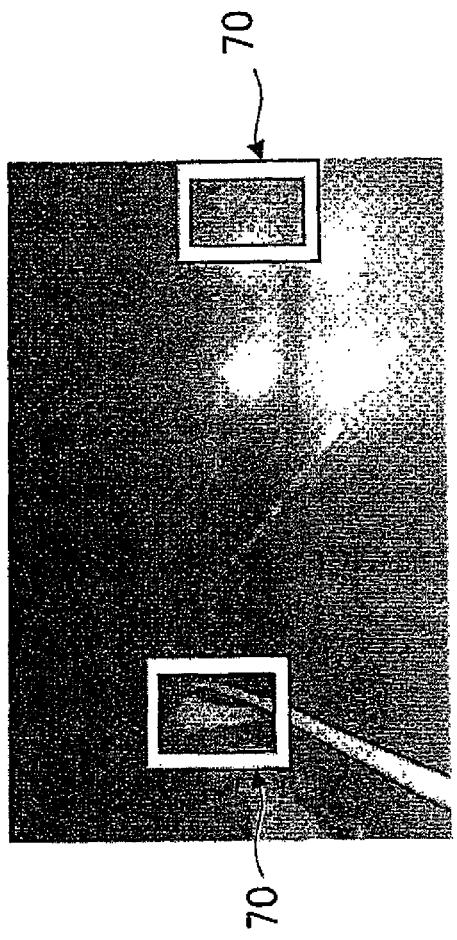
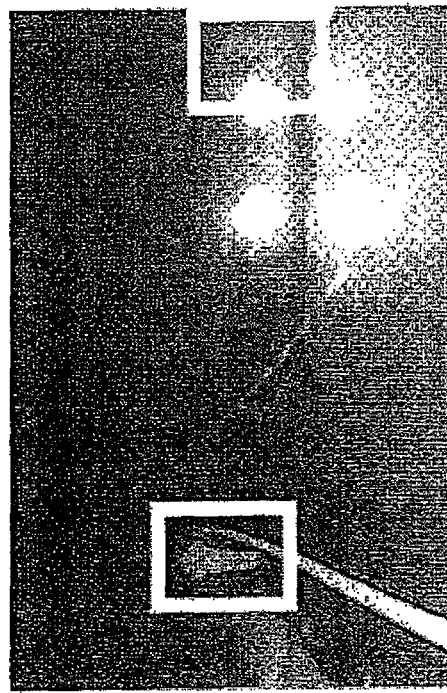
FIG. 5B [FIRST EMBODIMENT]
FIG. 5A [COMPARATIVE EXAMPLE]

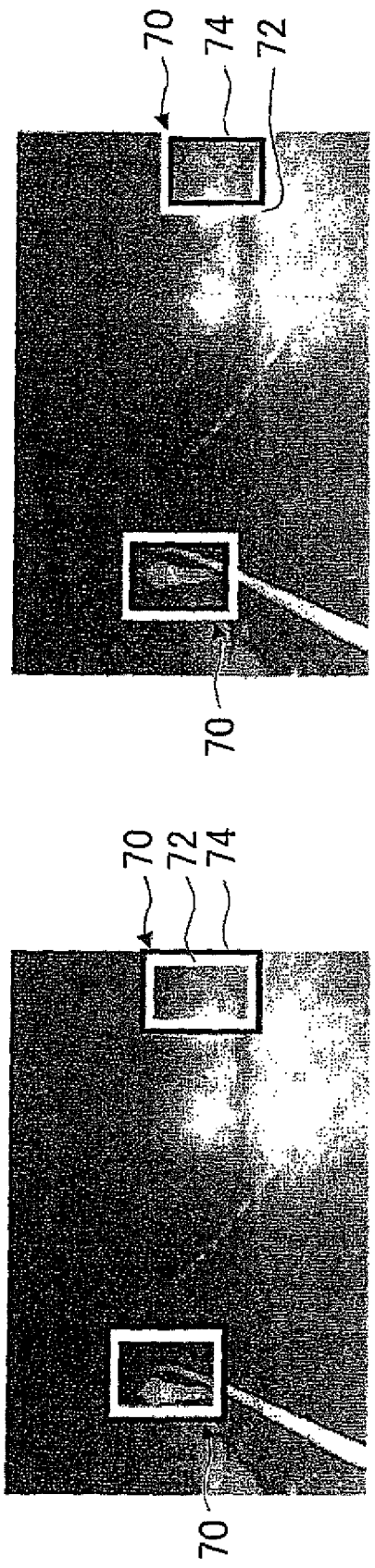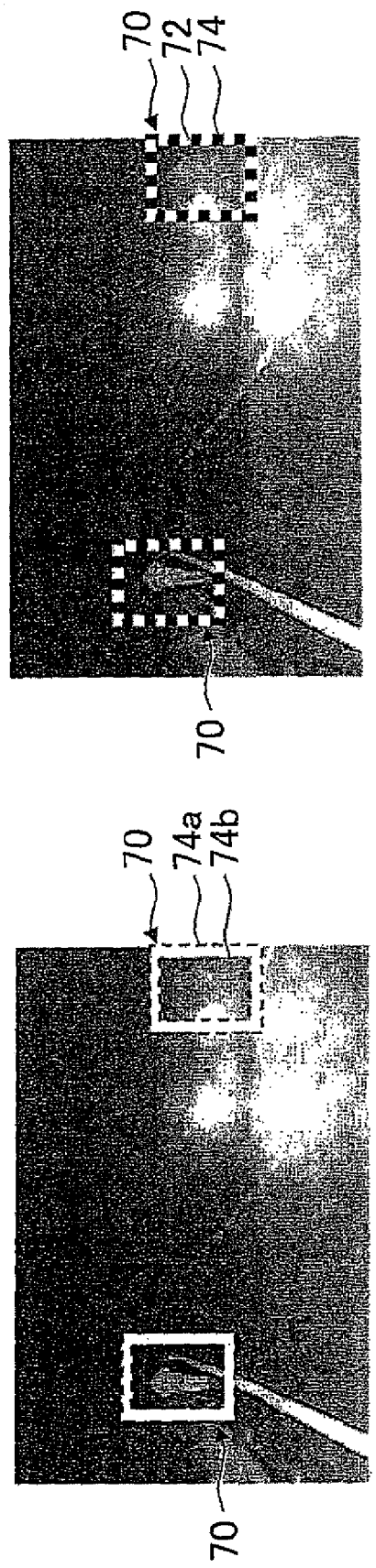

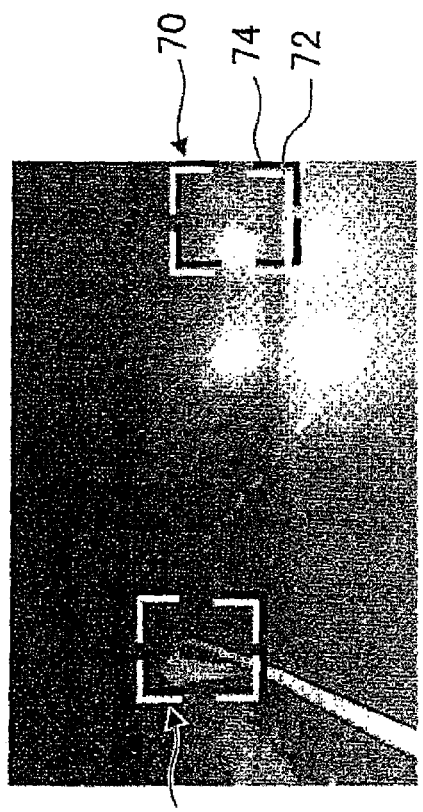
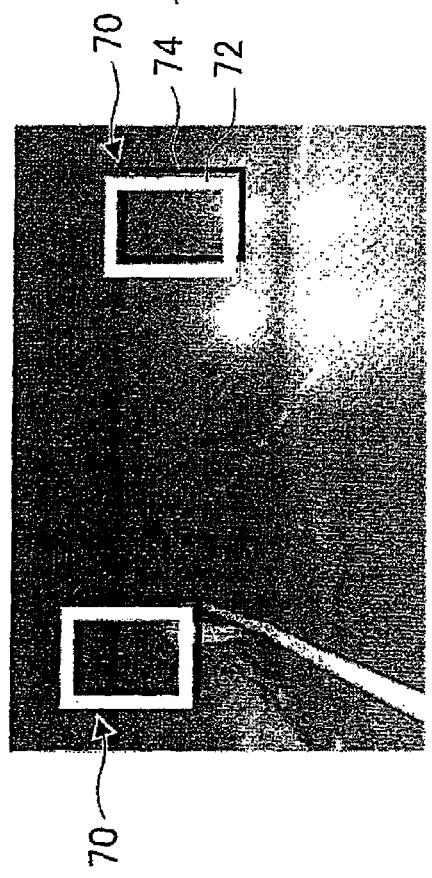

F I G . 11A
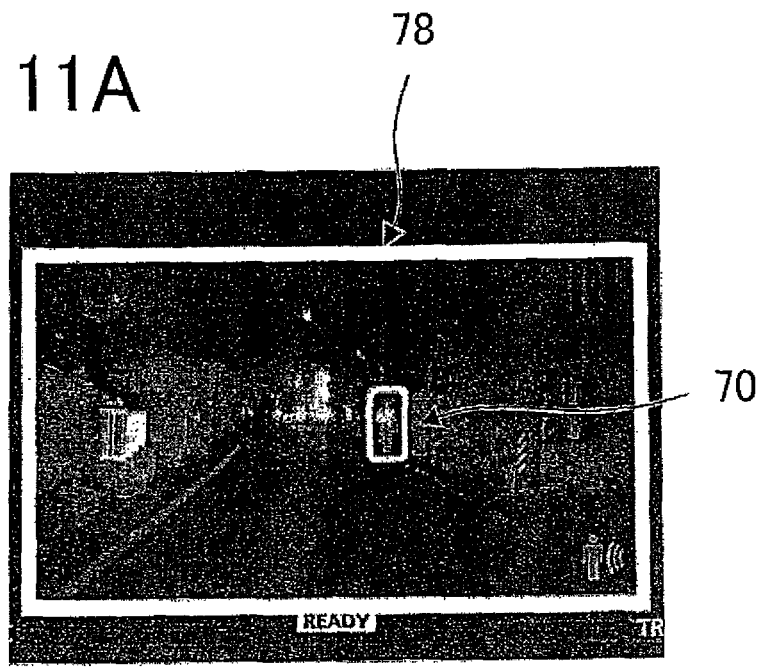
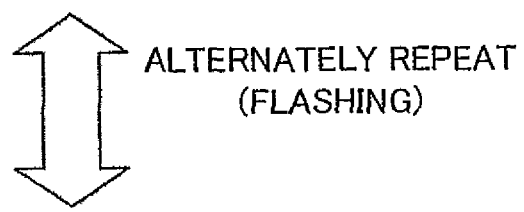
ALTERNATELY REPEAT
(FLASHING)
F I G . 11B
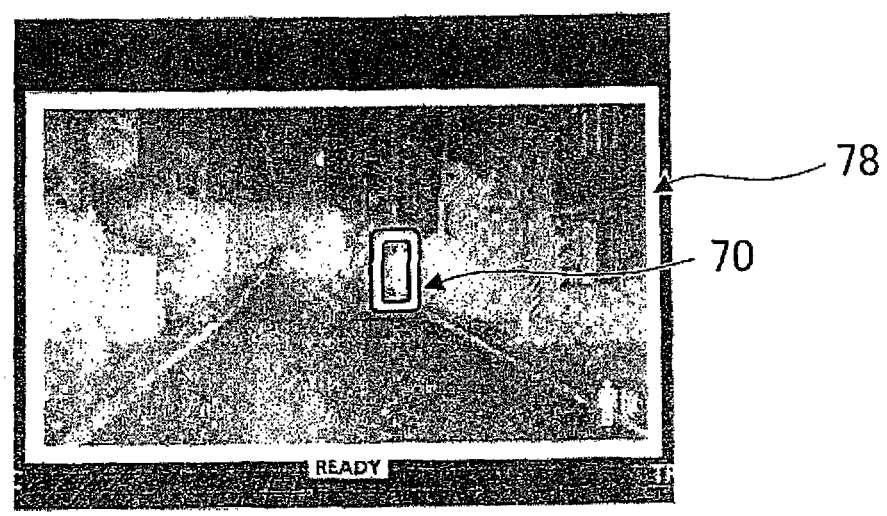

F I G. 12A
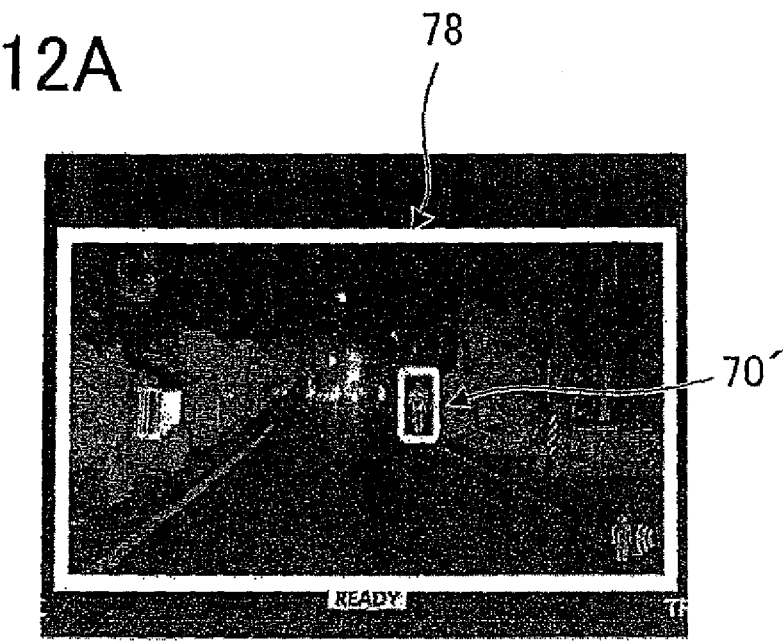
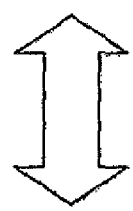
ALTERNATELY REPEAT
(FLASHING)
F I G. 12B
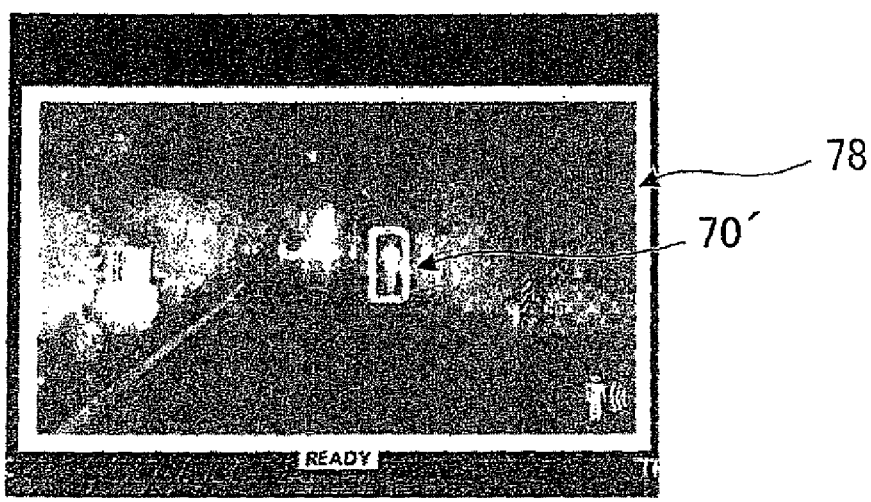

[COMPARATIVE EXAMPLE]

FRAME BORDER

[SECOND EMBODIMENT]

SURROUNDING IMAGE DISPLAY SYSTEM AND SURROUNDING IMAGE DISPLAY METHOD FOR VEHICLE

BACKGROUND OF THE INVENTION

1. Field of the Invention

The invention relates to a surrounding image display system, surrounding image display method, and the like, for a vehicle.

2. Description of Related Art

It is known that, when an image captured by a camera is displayed, in order for a driver to easily visually recognize the position of an attention object recognized through image processing, a frame border that surrounds the recognized attention object, that is, obstacle marking, is superimposed (for example, see Japanese Patent Application Publication No. 2007-159036 (JP-A-2007-159036)).

In addition, as a method of displaying a frame border of this type, there is known a method in which a frame border, that is, a band-like frame, set around an obstacle is displayed by increasing the degree of blurring as the risk of an obstacle increases or a method in which the color of the band-like frame is also changed in response to the risk, for example, the lightness of the color is changed so that a difference in lightness from the background increases, for example, like an obstacle is colored by red, orange, yellow or blue in descending order of risk (for example, see Japanese Patent Application Publication No. 2009-40108 (JP-A-2009-40108)).

However, when a frame border is displayed in a single color, the frame border becomes inconspicuous because of the relation with a background color or the relation with the brightness of a background and, therefore, the highlighting effect of an attention object owing to the frame border may be decreased.

SUMMARY OF THE INVENTION

The invention provides a surrounding image display system, surrounding image display method, and the like, for a vehicle, which are able to display a frame border in a mode in which the highlighting effect of an attention object is not decreased.

A first aspect of the invention relates to a surrounding image display system equipped for a vehicle. The surrounding image display system includes a processing unit that is connected to a camera that captures an image around the vehicle, wherein the processing unit processes the captured image from the camera to recognize an attention object, and then generates a display image in which a frame border that at least partially surrounds the recognized attention object is superimposed on the captured image, and the frame border includes a first frame border portion that is drawn in a first color and a second frame border portion that is drawn in a second color different from the first color.

In addition, a second aspect of the invention relates to a surrounding image display method for a vehicle. The surrounding image display method includes: processing a captured image from a camera, which captures an image around the vehicle, to recognize an attention object; and generating a display image in which a frame border, which at least partially surrounds the recognized attention object and which includes a first frame border portion drawn in a first color and a second frame border portion drawn in a second color different from the first color, is superimposed on the captured image.

According to the above aspects, it is possible to obtain a surrounding image display system, surrounding image display method, and the like, for a vehicle, which are able to display a frame border in a mode in which the highlighting effect of an attention object is not decreased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5A is a display image that includes frame borders according to a comparative example;

FIG. 5B is a display image that includes frame borders according to the first embodiment;

FIG. 6A to FIG. 6D are views that show other examples of display images that include generated frame borders;

FIG. 8A and FIG. 8B are views that show further other examples of display images that include generated frame borders;

FIG. 11A and FIG. 11B are views that show an example of the state of a display image during flashing according to the first embodiment;

FIG. 12A and FIG. 12B are views that show an example of the state of a display image during flashing according to a comparative example;

DETAILED DESCRIPTION OF EMBODIMENTS

Figure 1:
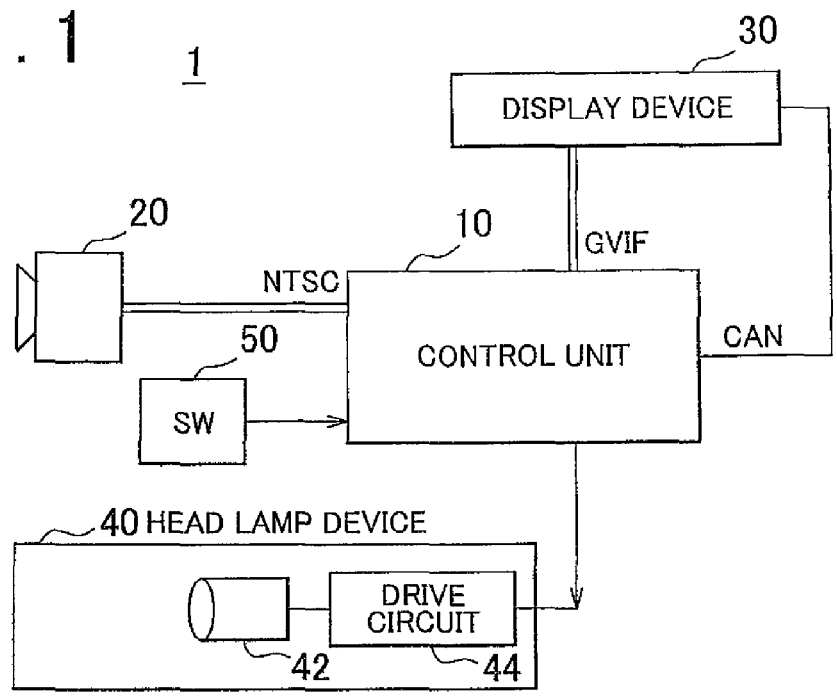
FIG. 1 is a block diagram that shows the configuration of a relevant portion of a vehicle surrounding image display system 1 according to a first embodiment of the invention.

FIG. 1 is a block diagram that shows the configuration of a relevant portion of a vehicle surrounding image display system 1 according to a first embodiment of the invention. The vehicle surrounding image display system 1 is principally formed of a control unit (ECU) 10. The control unit 10 is formed of a microcomputer that includes a CPU, a ROM, a RAM, and the like, that are connected to one another via a bus (not shown). The ROM stores data and various programs executed by the CPU in order to implement various functions (described later). For example, the control unit 10 may be implemented by a single ECU or may be implemented by cooperation among two or more ECUs. Note that the control unit 10 may function as a processing unit according to the aspect of the invention.

A near-infrared camera 20 is connected to the control unit 10. The near-infrared camera 20 is provided in correspondence with a near-infrared light irradiation device 42 (described later). The near-infrared camera 20 has a sensitivity distribution to a near infrared ray, and may be, for example, a charge-coupled device (CCD) camera that has a sensitivity distribution to a near infrared ray. The near-infrared camera 20 is provided inside a vehicle cabin so as to capture a near-infrared irradiation area (described later) using the near-infrared light irradiation device 42. For example, the near-infrared camera 20 may be installed at the back side of a rearview mirror, that is, the vehicle front side of the rearview mirror. The near-infrared camera 20 may be configured to acquire a forward near-infrared image in real time and supplies the forward near-infrared image to the control unit 10 in NTSC signal while a function select button 50 (described later) is turned on.

The control unit 10 performs image processing on the forward near-infrared image supplied from the near-infrared camera 20 to detect and recognize an attention object that can be present ahead of the vehicle. The attention object is typically a human, such as a pedestrian; instead, the attention object may be another animal. Note that there are various algorithms for recognizing and determining a pedestrian, or the like, through image processing and a selected appropriate algorithm may be employed. For example, a high-luminance area in the forward near-infrared image may be detected and then a pedestrian, or the like, may be recognized on the basis of the shape, motion, distance, and the like, of the high-luminance area.

The control unit 10 generates a display image for providing a driver, or the like, with various pieces of information about a condition ahead of the vehicle on the basis of the forward near-infrared image supplied from the near-infrared camera 20. Typically, the control unit 10 generates a display image for informing a driver, or the like, of the presence of an attention object that can be present ahead of the vehicle and the position of the attention object on the basis of the forward near-infrared image supplied from the near-infrared camera 20.

A display device 30 is connected to the control unit 10. The display device 30 may be, for example, a liquid crystal display. The display device 30 is provided at a position inside the vehicle cabin, at which the driver easily visually recognizes the display device 30. For example, the display device 30 may be provided on an instrument panel. The display device 30 displays a display image (image generated on the basis of the forward near-infrared image from the near-infrared camera 20) supplied from the control unit 10. For example, the display device 30 may receive a control signal from the control unit 10 via a controller area network (CAN), and may receive a video signal from the control unit 10 via a gigabit video interface (GVIF).

A head lamp device 40 is connected to the control unit 10. The head lamp device 40 includes the near-infrared light irradiation device 42 and a drive circuit 44 for the near-infrared light irradiation device 42. The near-infrared light irradiation device 42 is, for example, installed at each side of the front of the vehicle. The near-infrared light irradiation device 42 may be assembled into a headlight assembly that includes a head lamp. The optical axis of the near-infrared light irradiation device 42 is adjusted so as to irradiate near-infrared light toward an area ahead of the vehicle. Hereinafter, the area ahead of the vehicle, toward which near-infrared light is irradiated by the near-infrared light irradiation device 42, is termed a "near-infrared irradiation area". The drive circuit 44, for example, activates the near-infrared light irradiation device 42 in response to an ON command from the control unit 10. The ON command from the control unit 10 is typically generated at the time when the function select button 50 (described later) is turned on. As the near-infrared light irradiation device 42 is activated, near-infrared light is irradiated toward the near-infrared irradiation area, and a forward near-infrared image is captured by the near-infrared camera 20 in real time.

Note that the near-infrared irradiation area is typically set at an area farther from the low beam irradiation area of the head lamp. This is because the near-infrared irradiation area is set to an area that the low beam cannot illuminate or does not suffice the amount of illumination to thereby monitor an attention object, such as a pedestrian, that is present at a far position at which the driver is hard to visually recognize the attention object. Note that the low beam irradiation area may be an area up to about 40 m ahead of the vehicle and the near-infrared irradiation area may be an area further ahead of the vehicle with respect to the low beam irradiation area, such as an area from about 40 to 100 m ahead of the vehicle. Note that the near-infrared irradiation area and the low beam irradiation area may be close to each other or may be partially overlapped.

The function select button 50 is connected to the control unit 10. The function select button 50 is a switch for changing ON/OFF of a night view function. The function select button 50 is provided at a position inside the vehicle cabin, at which the driver easily operates the function select button 50. The function select button 50 may be, for example, provided on the instrument panel, a steering column, or the like.

Figure 2:
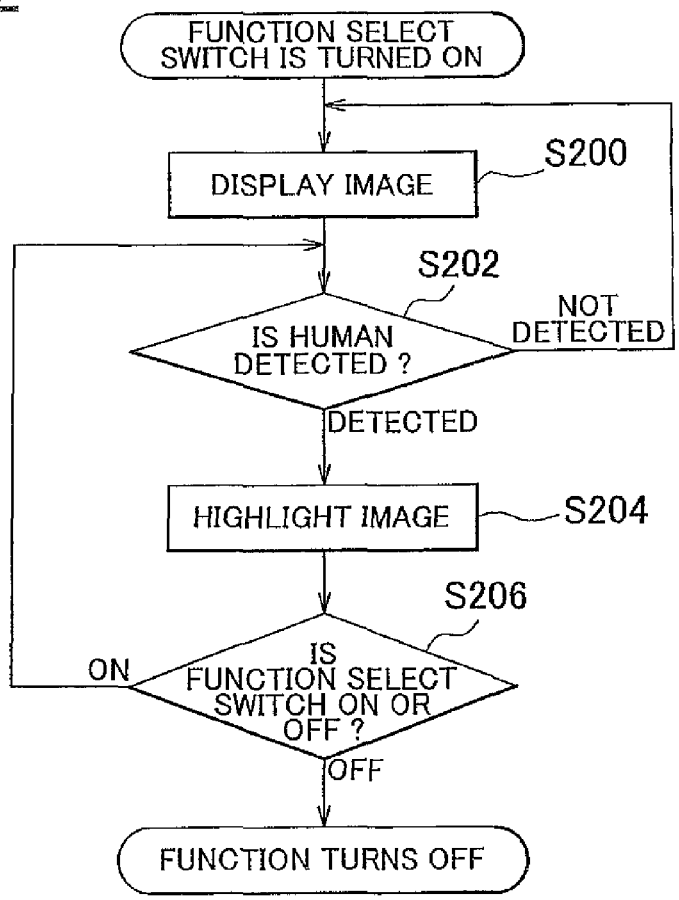
FIG. 2 is a flowchart that shows an example of major processes implemented by a control unit according to the first embodiment.

FIG. 2 is a flowchart that shows an example of major processes implemented by the control unit 10 according to the present embodiment.

The routine shown in FIG. 2 may be started when the function select button 50 is turned on by a user.

In step 200, the control unit 10 displays a display image on the display device 30 on the basis of a forward near-infrared image supplied from the near-infrared camera 20.

In step 202, the control unit 10 performs image processing on the forward near-infrared image supplied from the near-infrared camera 20, and determines whether an attention-seeking object, such as a human, is detected. When a human is detected, the process proceeds to step 204. On the other hand, when no human is detected, the process proceeds to step 200. In this case, in step 200, a display image that does not include a highlight (described later), that is, a frame border, is displayed on the display device 30.

In step 204, the control unit 10 highlights the detected human in order to call user's attention, particularly, driver's attention, to the detected human. Specifically, the control unit 10 superimposes a frame border that at least partially surrounds the detected human, and generates a display image that includes the frame border (described later). Then, the display image that includes the frame border is displayed on the display device 30. The details of the frame border will be described later.

In step 206, the control unit 10 determines whether the function select button 50 is ON or OFF. When the function select button 50 is ON, the process returns to step 202 and then repeats the processes in step 202 and the following steps. On the other hand, when the function select button 50 is OFF, the process directly ends.

Figure 3:
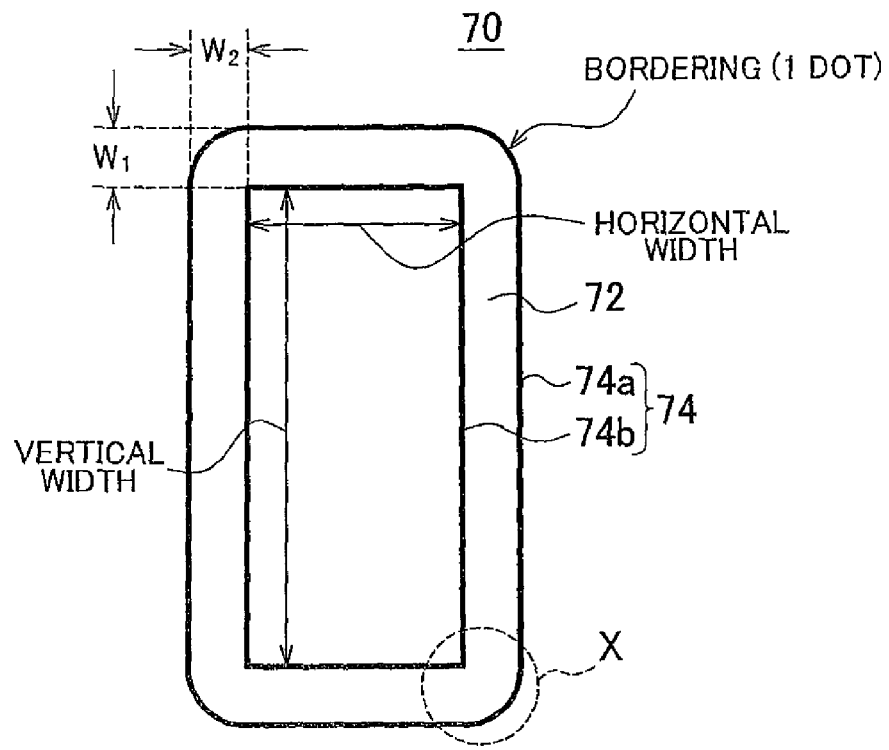
FIG. 3 is a view that shows an example of a frame border according to the first embodiment.

FIG. 3 is a view that shows an example of a frame border generated in step 204 of FIG. 2. The frame border 70 shown in FIG. 3 has a substantially rectangular shape as a whole. The frame border 70 includes a main frame border portion 72 and a sub-frame border portion 74. The main frame border portion 72 is drawn in a first color, and the sub-frame border portion 74 is drawn in a second color that is different from the first color. Note that, when a display image is a grayscale image, the first color and the second color are achieved by the difference in level of gray. For example, the levels are selected so that the first color is white and the second color is black. In this case, the first color and the second color may be selected so as to be separated by the maximum level from each other. For example, in the case of 256 levels of gray, the first color may be represented by "255" (white), and the second color may be represented by "0" (black). In addition, when the frame border 70 is represented in RGB, the first color may be set to white of which the RGB values are R=255, G=255 and B=255, and the second color may be set to black of which the RGB values are R=0, G=0 and B=0. Alternatively, the first color and the second color may be selected so as to be complementary colors. That is, the first color and the second color are selected so as not to be the same type of color or similar colors.

As shown in FIG. 3, the sub-frame border portion 74 is provided in association with the main frame border portion 72. In the example shown in FIG. 3, the sub-frame border portion 74 is drawn in a mode in which the sub-frame border portion 74 borders the main frame border portion 72. Specifically, the sub-frame border portion 74 includes an outer bordering portion 74a and an inner bordering portion 74b. The outer bordering portion 74a is adjacent to the outer periphery of the main frame border portion 72. The inner bordering portion 74b is adjacent to the inner periphery of the main frame border portion 72.

Note that the widths $W_1$ and $W_2$ of the main frame border portion 72 may be constant or may be varied. In addition, the width $W_2$ of each of the vertical portions of the main frame border portion 72 may be equal to the width $W_1$ of each of the horizontal portions of the main frame border portion 72 or may be different from the width $W_1$. This also applies to the sub-frame border portion 74. In addition, the size of the frame border 70 may be varied on the basis of the size of an image of a detected attention-seeking object.

Figure 4:
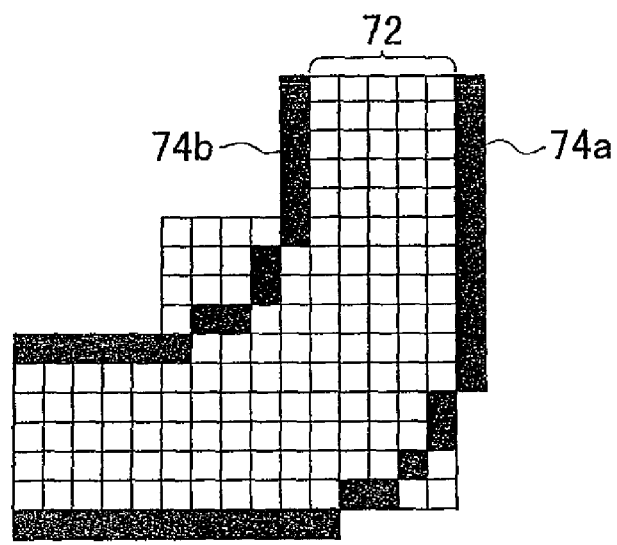
FIG. 4 is an enlarged view of a corner portion (portion X in FIG. 3) of the frame border according to the first embodiment.

FIG. 4 is an enlarged view of a corner portion, that is, a portion X of FIG. 3, of the frame border 70. As shown in FIG. 4, the corner portions of the frame border 70 may be rounded. In the example shown in FIG. 4, the widths $W_1$ and $W_2$ of the main frame border portion 72 are drawn in 5 dots, and both the outer bordering portion 74a and inner bordering portion 74b of the sub-frame border portion 74 are drawn in 1 dot.

FIG. 5A shows a comparative example. FIG. 5B is a view that shows an example of a display image that includes frame borders generated in step 204 of FIG. 2.

In FIG. 5A, the frame borders are drawn in a single color, for example, in white. In this case, as shown in the drawing, the frame border for a pedestrian detected at the right side may be inconspicuous because of the states of surrounding pixels. In the example shown in FIG. 5A, the luminances of the pixels surrounding the pedestrian detected at the right side increase because of illumination from the headlight of an oncoming vehicle and, therefore, the frame border for the pedestrian detected at the right side is inconspicuous.

In contrast to this, according to the present embodiment, as shown in FIG. 5B, each of the frame borders is drawn in two colors, that is, each frame border includes the main frame border portion 72 and the sub-frame border portion 74. Thus, as shown in FIG. 5B, even when the luminances of the pixels around the pedestrian detected at the right side are higher than that of the headlight of an oncoming vehicle, the frame border 70 for the pedestrian detected at the right side never becomes inconspicuous owing to the presence of the sub-frame border portion 74 that has the large difference in color or brightness from the surrounding pixels. That is, the highlighting effect of the frame border 70 for the pedestrian detected at the right side may be maintained. In this way, according to the present embodiment, each frame border 70 is drawn in two colors to thereby make it possible to effectively maintain the highlighting function of the frame border 70 for an attention object irrespective of the states of pixels around the attention object.

FIG. 6A to FIG. 6D are views that show other examples of a display image that includes frame borders 70 generated in step 204 of FIG. 2.

In the example shown in FIG. 6A, the sub-frame border portion 74 is drawn in a mode in which the sub-frame border portion 74 borders only the outer periphery of the main frame border portion 72. That is, the example shown in FIG. 6A corresponds to a configuration that the inner bordering portion 74b shown in FIG. 4 is omitted. Note that the sub-frame border portion 74 may be drawn on the main frame border portion 72 near the center in the width direction of the main frame border portion 72. In this case, the sub-frame border portion 74 is bordered by the main frame border portion 72, and this case is substantially equivalent to the case where the color of the sub-frame border portion 74 and the color of the main frame border portion 72 are interchanged.

In the example shown in FIG. 6B, the sub-frame border portion 74 is drawn in a mode in which the sub-frame border portion 74 borders only the inner periphery of the main frame border portion 72. That is, the example shown in FIG. 6B differs from the example shown in FIG. 4 only in that the outer bordering portion 74a is omitted.

In the example shown in FIG. 6C, the sub-frame border portion 74 is drawn in a dotted line. Note that the sub-frame border portion 74 may be drawn in another line type, such as an alternate long and short dashes line and a broken line. In addition, one of the outer bordering portion 74a and the inner bordering portion 74b may be drawn in a line type different from that of the other. In this case, one of the outer bordering portion 74a and the inner bordering portion 74b may be drawn in a solid line. In addition, the example shown in FIG. 6C may be implemented in combination with the example shown in FIG. 6A or the example shown in FIG. 6B. That is, in each of the example shown in FIG. 6A and the example shown in FIG. 6B, the sub-frame border portion 74 may be drawn in a line type other than a solid line.

In the example shown in FIG. 6D, the sub-frame border portion 74 is drawn so as to form a dotted line in cooperation with the main frame border portion 72. That is, each of the frame borders 70 is drawn so that the sub-frame border portion 74 and the main frame border portion 72 alternately appear along the longitudinal direction of the line. Note that, similarly, the sub-frame border portion 74 may be drawn to form another line type, such as an alternate long and short dashes line and a broken line, in cooperation with the main frame border portion 72.

FIG. 7A to FIG. 7D are views that show further other examples of a display image that includes frame borders generated in step 204 of FIG. 2.

Figure 7A:
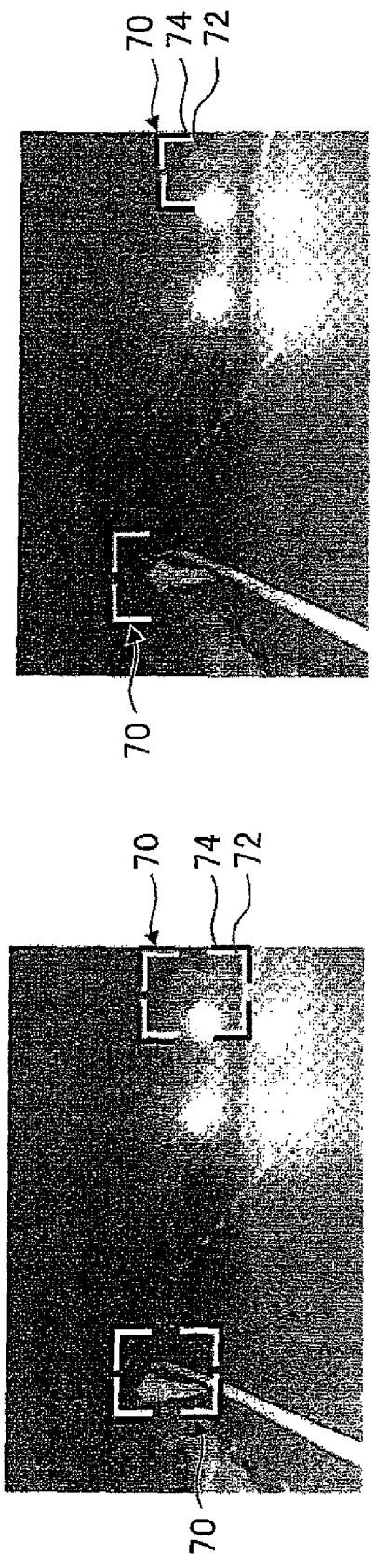
FIG. 7A to FIG. 7D are views that show further other examples of display images that include generated frame borders.

In the example shown in FIG. 7A, each frame border 70 is not continuous all around but drawn discretely. That is, each frame border 70 is drawn so as to partially surround a detected attention object. Specifically, each frame border 70 is drawn with a gap at each of center portions of four sides of a rectangle. Note that, in the example shown in FIG. 7A, each sub-frame border portion 74 is drawn in a mode in which the sub-frame border portion 74 borders only the outer periphery of the main frame border portion 72; instead, each sub-frame border portion 74 may be drawn in a mode in which the sub-frame border portion 74 borders only the inner periphery of the main frame border portion 72 or may be drawn in a mode in which the sub-frame border portion 74 borders both the inner periphery and outer periphery of the main frame border portion 72. In addition, in the example shown in FIG. 7A, it is also applicable that only one of the main frame border portion 72 and the sub-frame border portion 74 is drawn discretely and the other one is drawn continuously all around (see FIG. 9A and FIG. 9B).

Figure 7B:
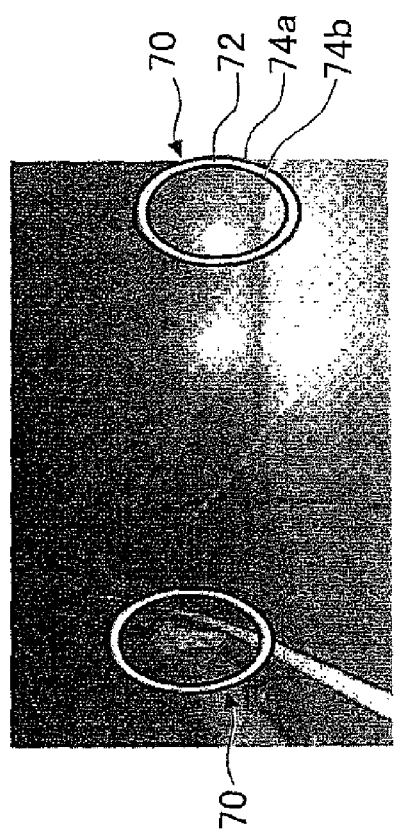

In the example shown in FIG. 7B, each frame border 70 is not continuous all around but drawn discretely. That is, each frame border 70 is drawn so as to surround only the upper side of a detected attention object. Specifically, each frame border 70 is drawn in a mode in which the frame border 70 is drawn by only the substantially upper half of a rectangle with a gap at the center portion of the upper side. Note that, in the example shown in FIG. 7B, each sub-frame border portion 74 is drawn in a mode in which the sub-frame border portion 74 borders only the outer periphery of the main frame border portion 72; instead, each sub-frame border portion 74 may be drawn in a mode in which the sub-frame border portion 74 borders only the inner periphery of the main frame border portion 72 or may be drawn in a mode in which the sub-frame border portion 74 borders both the inner periphery and outer periphery of the main frame border portion 72. In addition, in the example shown in FIG. 7B, it is also applicable that only one of the main frame border portion 72 and the sub-frame border portion 74 is drawn discretely and the other one is drawn continuously.

Figure 7C:
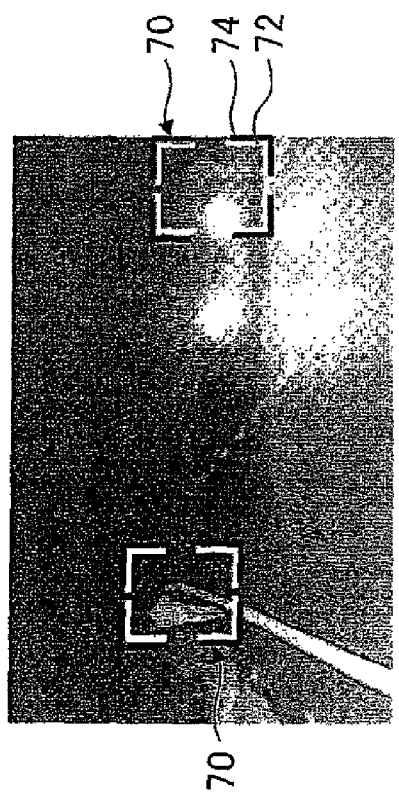

In the example shown in FIG. 7C, each frame border 70 is not continuous all around but drawn discretely. That is, each frame border 70 is drawn so as to surround only the lower side of a detected attention object. Specifically, each frame border 70 is drawn in a mode in which the frame border 70 is drawn by only the substantially lower half of a rectangle with a gap at the center portion of the lower side. Note that, in the example shown in FIG. 7C, each sub-frame order portion 74 is drawn in a mode in which the sub-frame border portion 74 borders only the outer periphery of the main frame border portion 72; instead, each sub-frame border portion 74 may be drawn in a mode in which the sub-frame border portion 74 borders only the inner periphery of the main frame border portion 72 or may be drawn in a mode in which the sub-frame border portion 74 borders both the inner periphery and outer periphery of the main frame border portion 72. In addition, in the example shown in FIG. 7C, it is also applicable that only one of the main frame border portion 72 and the sub-frame border portion 74 is drawn discretely and the other one is drawn continuously.

Figure 7D:
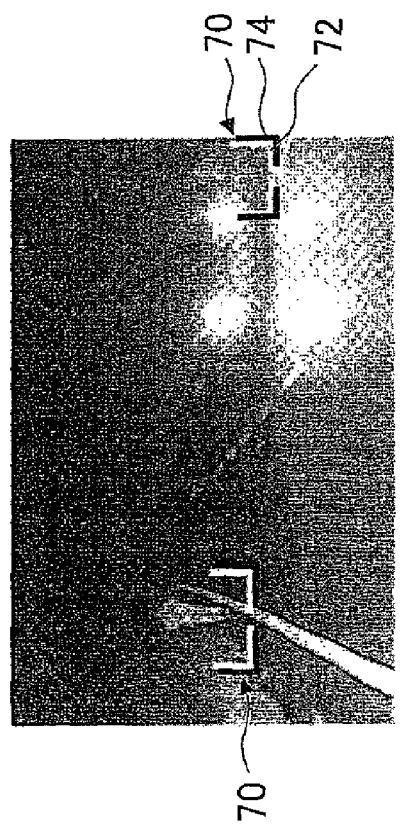

In the example shown in FIG. 7D, each frame border 70 has not a rectangular shape but an oblong circular (elliptical) shape. In this way, as long as each frame border 70 at least partially surrounds a detected attention object, the shape of the frame border 70 may be selected. Note that, in the example shown in FIG. 7D, the main frame border portion 72 and sub-frame border portion 74 of each frame border 70 are configured in a relation similar to those of the rectangular frame border 70 shown in FIG. 3; instead, each frame border 70 shown in FIG. 7D and another frame border 70 having a selected shape may have similar variations to those of the rectangular frame borders 70 illustrated with reference to FIG. 6A to FIG. 8B, and the like.

FIG. 8A and FIG. 8B are views that show further other examples of a display image that includes frame borders generated in step 204 of FIG. 2.

In the examples shown in FIG. 8A and FIG. 8B, each frame border 70 is drawn so as to be stereoscopic, that is, to have a sense of depth. Specifically, each frame border 70 is drawn so that the sub-frame border portion 74 is displaced obliquely toward lower right on the image with respect to the main frame border portion 72. In the example shown in the drawing, each sub-frame border portion 74 is drawn so as to be displaced downward and rightward with respect to the main frame border portion 72 by the amount corresponding to the width of the main frame border portion 72. Note that the offset direction in which the sub-frame border portion 74 is displaced from the main frame border portion 72 is not limited to the oblique lower right direction; the offset direction may be an oblique upper right direction, an oblique lower left direction, an oblique upper left direction, or the like. In addition, the shape variations of the main frame border portion 72 and sub-frame border portion 74 may include another shape other than those shown in FIG. 8A and FIG. 8B, such as the shapes shown in FIG. 7B, FIG. 7C and FIG. 7D.

FIG. 9A to FIG. 9D are views that show further other examples of a display image that includes frame borders generated in step 204 of FIG. 2.

Figure 9A:
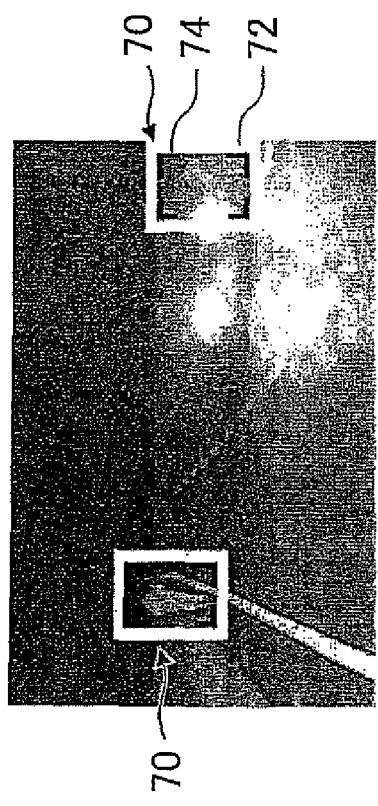
FIG. 9A to FIG. 9D are views that show further other examples of display images that include generated frame borders.
Figure 9B:
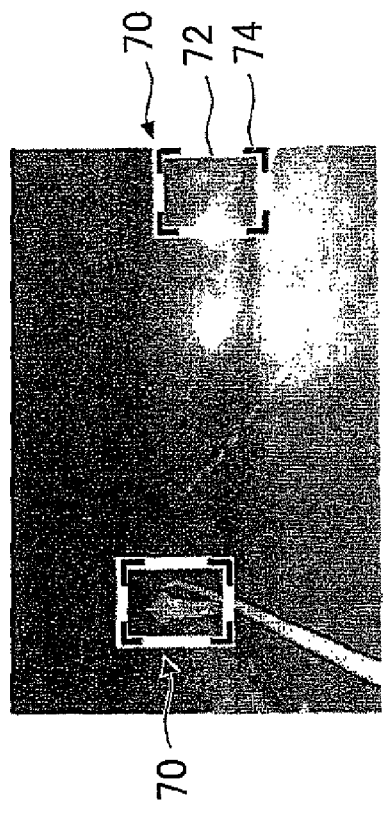
Figure 9C:
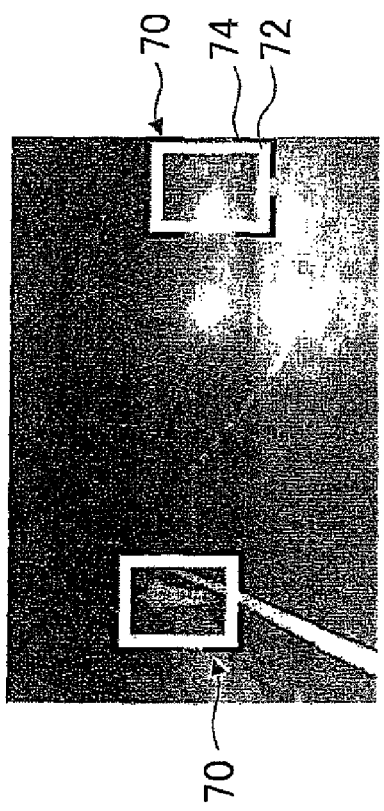
Figure 9D:
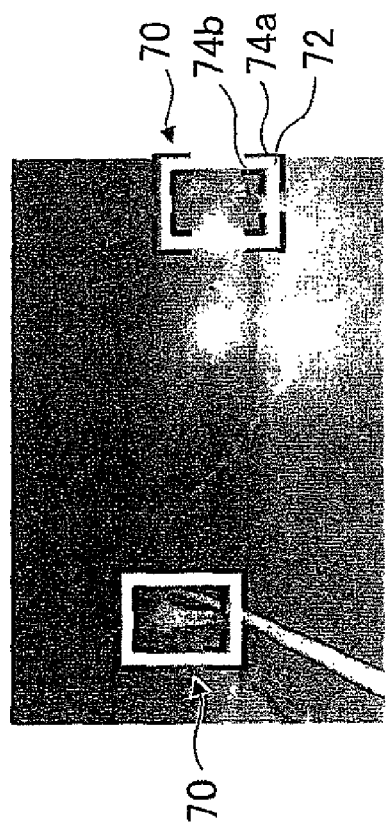

In the example shown in FIG. 9A, each frame border 70 is drawn in a mode in which the sub-frame border portion 74 borders only the outer peripheries of four corner portions of the main frame border portion 72. In the example shown in FIG. 9B, each frame border 70 is drawn in a mode in which the sub-frame border portion 74 borders only the inner peripheries of four corner portions of the main frame border portion 72. In the example shown in FIG. 9C, each frame border 70 is drawn in a mode in which the sub-frame border portion 74 borders only both the outer sides and inner sides of four corner portions of the main frame border portion 72. In the example shown in FIG. 9D, each frame border 70 is drawn so that the sub-frame border portion 74 is drawn at the center portions (center portions in the width direction) of only four corner portions of the main frame border portion 72.

Figure 10:
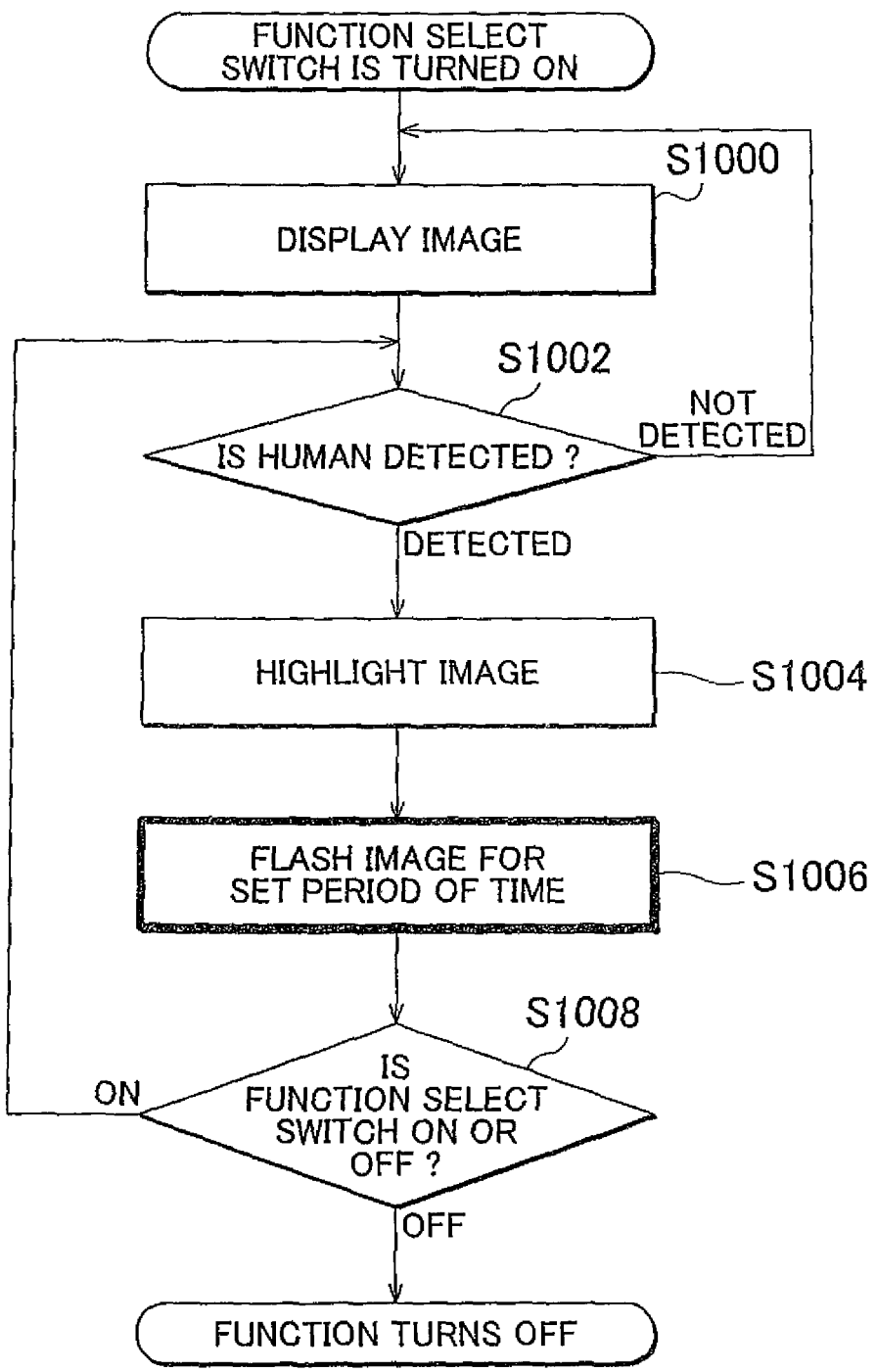
FIG. 10 is a flowchart that shows another example of major processes implemented by the control unit according to the first embodiment.

FIG. 10 is a flowchart that shows another example of processes implemented by the control unit 10 according to the present embodiment. The routine shown in FIG. 10 mainly differs from the example shown in FIG. 2 in that step 1006 is added. The processes of steps 1000, 1002, 1004 and 1008 may be the same as the processes of steps 200, 202, 204 and 206 shown in FIG. 2.

In step 1006, the control unit 10 causes the display image displayed on the display device 30 to flash for a set period of time. Flashing includes repeatedly alternately changing the entire or substantially entire display image between a normal display state and a display state in which the luminances of the pixels are increased (hereinafter, referred to as high-luminance display state) for a set period of time. The high-luminance display state may be a state where a set luminance or a set rate of luminance is added to the luminances of the pixels in the normal display state (however, when the resultant luminance exceeds a maximum luminance, the maximum luminance is used) or may be a state where the luminances of the pixels are uniformly varied to a set higher luminance (for example, maximum luminance). For example, when a display image is a grayscale image, in the high-luminance display state, the levels of the pixels may be varied to white ("255") or a level close to white by a set value or at a set rate.

In the present embodiment, at the time of flashing, it is desirable that the brightness of the frame, border 70 is not substantially varied from the brightness in the normal display state. That is, the brightness of the frame border 70 is kept substantially constant during flashing. For example, when a display image is a grayscale image, the main frame border portion 72 of the frame border 70 is drawn in white ("255") and the sub-frame border portion 74 of the frame border 70 is drawn in black ("0"), the black ("0") of the sub-frame border portion 74 is kept unchanged during flashing.

Note that flashing is to attract user's attention, particularly, driver's attention; however, a display image itself is hard to be visually recognized in the high-luminance display state during flashing, so a set period of time for flashing may be appropriately determined in consideration of attention seeking and the visibility of the display image. For example, during flashing, the high-luminance display state may be established only three or four times.

FIG. 11A and FIG. 11B are views that show an example of the state of a display image according to the present embodiment during flashing. FIG. 11A shows a normal display state. FIG. 11B shows a high-luminance display state. FIG. 12A and FIG. 12B are views that show an example of the state of a display image according to a comparative example during flashing. FIG. 12A shows a normal display state. FIG. 12B shows a high-luminance display state.

In the comparative example, as shown in FIG. 12A, a frame border 70' is drawn in a single color (in this example, white). In this case, as shown in FIG. 12B, in the high-luminance display state during flashing, the frame border 70' for a detected pedestrian may be inconspicuous because of the high-luminance states of the surrounding pixels. In the example shown in the drawing, in the high-luminance display state, the levels of the pixels of the display image are varied to white ("255") or, a level close to white and, therefore, the frame border 70' for the detected pedestrian is inconspicuous.

In contrast to this, according to the present embodiment, as shown in FIG. 11A, the frame border 70 is drawn in two colors (see the main frame border portion 72 and the sub-frame border portion 74 in FIG. 4). Thus, according to the present embodiment, as shown in FIG. 11B, even in the high-luminance display state during flashing, the frame border 70 for the detected pedestrian never becomes inconspicuous owing to the presence of the sub-frame border portion 74 (see FIG. 3) of which the difference in color (or brightness) from the surrounding pixels is large. That is, even during flashing, it is possible to maintain the highlighting effect of the frame border 70 for the detected pedestrian. In this way, according to the present embodiment, by drawing the frame border 70 in two colors, it is possible to synergistically enhance the function of highlighting an attention object using the frame border 70 when in cooperation with flashing.

Note that, in the example shown in FIG. 11A and FIG. 11B, when a human (an example of an attention-seeking object) is detected, a display image is generated so that the above described frame border 70 is displayed and, in addition, the outer peripheral portion 78 of the display image is brightened. That is, the outer peripheral portion 78 of the display image is bordered with a bright color. For example, when a display image is a grayscale image, the outer peripheral portion 78 of the display image is drawn in white ("255"). By so doing, it is possible to effectively call user's attention (particularly, driver's attention) to a detected human.

Figure 13:
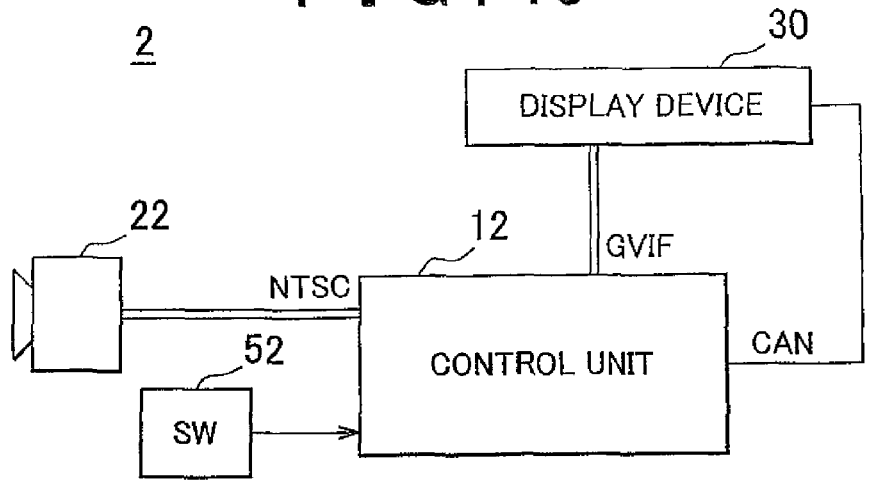
FIG. 13 is a block diagram that shows the configuration of a relevant portion of a vehicle surrounding image display system 2 according to a second embodiment of the invention.

FIG. 13 is a block diagram that shows the configuration of a relevant portion of a vehicle surrounding image display system 2 according to a second embodiment of the invention. The second embodiment differs from the above described first embodiment in that a display image is generated by a general camera without using the near-infrared camera 20. Hereinafter, components unique to the second embodiment will be described in detail, like reference numerals in the drawings denote components similar to those of the first embodiment and the detailed description thereof is omitted.

The vehicle surrounding image display system 2, as in the case of the above described first embodiment, is principally formed of a control unit (ECU) 12.

A camera 22 is connected to the control unit 12. The camera 22 may acquire a surrounding image outside a vehicle using a CCD, a complementary metal oxide semiconductor (CMOS), or the like. The camera 22 may be a wide angle camera that includes a fisheye lens. The camera 22 is provided at an appropriate position in accordance with a purpose to capture an image. For example, the camera 22 may be a front monitoring camera installed at a rearview mirror or a ceiling above a front seat, may be a rear monitoring camera installed at a back door or may be a side monitoring camera. The camera 22 may be configured to acquire a surrounding image in real time and supply the surrounding image to the control unit 12 in NTSC signal while a function select button 52 (described later) is turned on.

The control unit 12 performs image processing on the surrounding image supplied from the camera 22 to detect (recognize) an attention object that can be present around the vehicle. The attention object may be typically another vehicle; instead, the attention object may be another obstacle, a human (pedestrian) or an animal. Note that there are various algorithms for recognizing and determining another vehicle, or the like, through image processing and a selected appropriate algorithm may be employed.

The control unit 12 generates a display image for providing a driver, or the like, with various pieces of information around the vehicle on the basis of the surrounding image supplied from the camera 22. Typically, the control unit 12 generates a display image for informing a driver, or the like, of the presence of an attention object that can be present around the vehicle, the position of the attention object, or the like, on the basis of the surrounding image supplied from the camera 22.

As in the case of the above described first embodiment, a display device 30 and a function select button 52 are connected to the control unit 12. The function select button 52 is a switch for changing ON/OFF of the function implemented by the camera 22. Here, the function implemented using the camera 22 may be, for example, a park guide function used during park assist control and a drive recorder function that records a surrounding image for accident analysis, or the like. Here, the description will be made for a park guide function.

Figure 14:
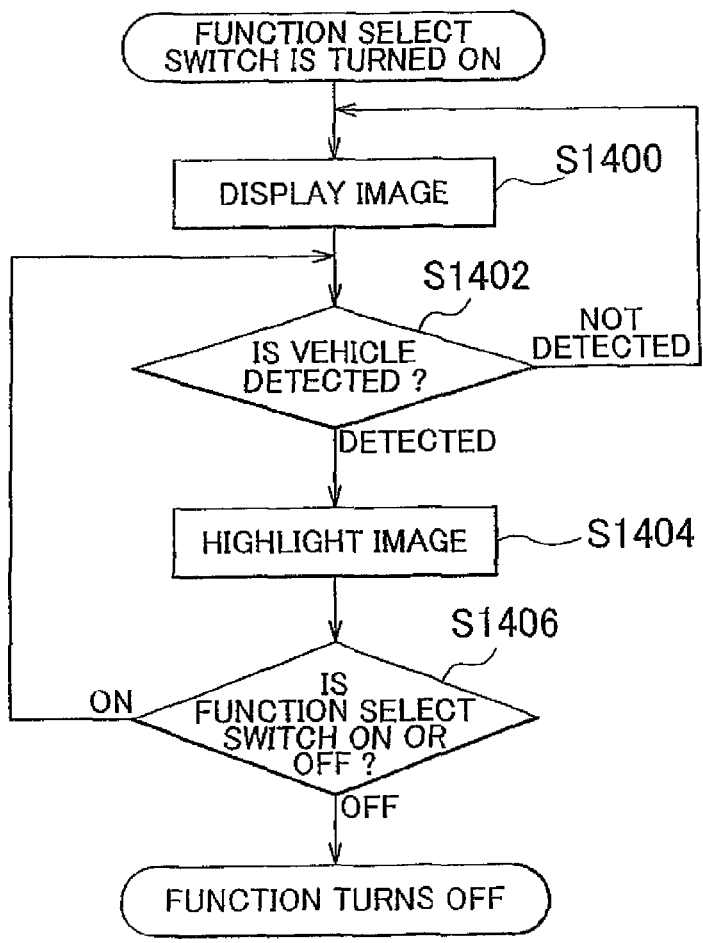
FIG. 14 is a flowchart that shows an example of major processes implemented by a control unit according to the second embodiment.

FIG. 14 is a flowchart that shows an example of major processes implemented by the control unit 12 according to the present embodiment.

The routine shown in FIG. 14 may be started when the function select button 52 is turned on by a user.

In step 1400, the control unit 12 displays a display image on the display device 30 on the basis of a surrounding image supplied from the camera 22.

In step 1402, the control unit 12 performs image processing on the surrounding image supplied from the camera 22, and determines whether another vehicle (an example of an attention-seeking object) is detected. When another vehicle is detected, the process proceeds to step 1404. On the other hand, when another vehicle is not detected, the process returns to step 1400. In this case, in step 1400, a display image that includes no frame border 70 is displayed on the display device 30.

In step 1404, the control unit 12 highlights the detected other vehicle. Specifically, the control unit 12 draws (superimposes) a frame border 70 that at least partially surrounds the detected other vehicle, and generates a display image that includes the frame border 70. Then, the display image that includes the frame border 70 is displayed on the display device 30.

In step 1406, the control unit 12 determines whether the function select button 52 is ON or OFF. When the function select button 52 is ON, the process returns to step 1402 and then repeats the processes in step 1402 and the following steps. On the other hand, when the function select button 52 is OFF, the process directly ends.

Figure 15A:
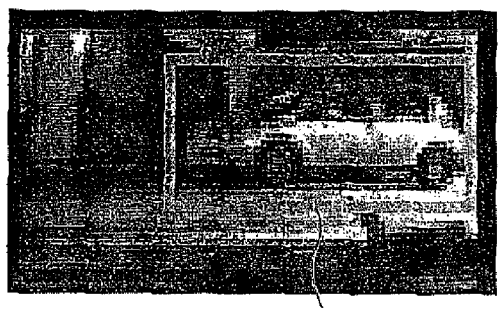
FIG. 15A is a display image that includes a frame border according to a comparative example.
Figure 15B:
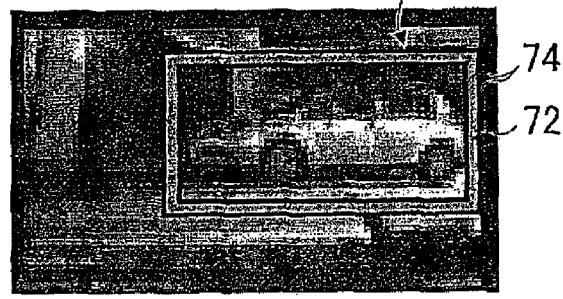
FIG. 15B is a display image that includes a frame border according to the second embodiment.

FIG. 15A shows a comparative example to the second embodiment. FIG. 15B is a view that shows an example of a display image (for example, a color image) that includes a frame border 70 generated in step 1404 of FIG. 14.

In FIG. 15A, the frame border is drawn in a single color (for example, yellow). In this case, as shown in the drawing, the frame border for a detected other vehicle may be inconspicuous because of the states of surrounding pixels. In the example of FIG. 15A, the colors of surrounding pixels (image of the wall of a parking) around the detected other vehicle are similar to the color of the frame border and, therefore, the frame border for the detected other vehicle is inconspicuous.

In contrast to this, according to the second embodiment, as shown in FIG. 15B, the frame border is drawn in two colors (the main frame border portion 72 and the sub-frame border portion 74). That is, the main frame border portion 72 is drawn in a first color, such as yellow, and the sub-frame border portion 74 is drawn in a second color, such as blue, different from the first color. Note that the first color and the second color may be complementary colors or may be selected so as not to be the same type of color or similar colors.

Thus, as shown in FIG. 15B, even when the colors of the surrounding pixels, such as the image of the wall of a parking, around the detected other vehicle are similar to the color of the main frame border portion 72 of the frame border 70, the frame border 70 for the detected other vehicle never becomes inconspicuous owing to the presence of the sub-frame border portion 74 of which the difference in color from the surrounding pixels is large. That is, the highlighting effect of the frame border 70 for the detected other vehicle may be maintained. In this way, according to the present embodiment, each frame border 70 is drawn in two colors to thereby make it possible to effectively maintain the function of highlighting an attention object using the frame border 70 irrespective of the states of pixels around the attention object.

Note that, in the second embodiment as well, flashing as described in the first embodiment may be carried out. For example, in step 1404 of FIG. 14, the control unit 12 may highlight the detected other vehicle and may flash the display image for a set period of time. In this case as well, the color or brightness of the frame color 70 in the normal display state is substantially maintained in a high-luminance state. By so doing, it is possible to synergistically enhance the function of highlighting an attention object using the frame border 70 when in cooperation with flashing.

The first and second embodiments of the invention are described in detail above; however, the aspect of the invention is not limited to the above described embodiments. The above described embodiments may be modified or replaced in various forms without departing from the scope of the invention.

For example, in the above described first embodiment, an area ahead of the vehicle is set as the near-infrared irradiation area and is captured by the near-infrared camera 20; instead, the near-infrared camera 20 may capture an area lateral to the vehicle or an area behind the vehicle. In this case, the near-infrared light irradiation device 42 is arranged and configured so that a near-infrared irradiation area corresponds to an area captured by the near-infrared camera 20 accordingly.

In addition, in the above described first embodiment, a near-infrared image captured from the near-infrared irradiation area may be, for example, displayed on the windshield glass of the vehicle by a head-up display (HUD).

In addition, in the above described embodiment, in the high-luminance state during flashing, the level of the color or brightness of the frame border 70 is not varied from the normal display state; however, even in the above described high-luminance state, as long as the effect of being able to make the frame border 70 conspicuous may be obtained, the color, or the like, of the frame border 70 may be varied from that in the normal display state. For example, when a display image is a grayscale image and the main frame border portion 72 is drawn in white ("255") and the sub-frame border portion 74 is drawn in black ("0") in the normal display state, the black ("0") of the sub-frame border portion 74 may be varied to a certain value (for example, "10") during flashing as long as the color is substantially black. In addition, it is only necessary that the frame border portion of one of the main frame border portion 72 and sub-frame border portion 74 of the frame border 70, having a lower brightness, may be made conspicuous also in the high-luminance state, so the frame border portion of the brighter one may have a selected brightness in the high-luminance state. In addition, in terms of a similar point, in synchronization of alternate change between the high-luminance state and the normal display state during flashing, the brightnesses or colors of the respective main frame border portion 72 and sub-frame border portion 74 of the frame border 70 may be alternately interchanged to be inverted.

In addition, in the above described embodiments, the frame border 70 is drawn in a set color independently of a scene, the type of an attention object, the degree of attention seeking, or the like; instead, a combination of two colors of the frame border 70 may be changed as long as the frame border 70 is drawn in two colors as described above. For example, a combination of two colors of the frame border 70 may be, for example, changed on the basis of a scene, the type of an attention object, the degree of attention seeking, or the like.

In addition, in the above described embodiments, the frame border 70 is drawn in two colors; instead, the frame border 70 may be drawn in three or more colors.

The invention claimed is:

1. A surrounding image display system equipped for a vehicle, comprising;
    a processor that is connected to a camera that captures an image around the vehicle, wherein
    the processor is configured to process the captured image from the camera to recognize an attention object, and then generate a display image in which a frame border that at least partially surrounds the recognized attention object is superimposed on the captured image, and
    the frame border includes a first frame border portion that is drawn in a first color and a second frame border portion that is drawn in a second color different from the first color,
    wherein, when the processor has processed the captured image from the camera to recognize the attention object, the processor carries out flashing, in which a brightness of the display image is temporarily increased and then returned to an original brightness, over a substantially entire area of the display image other than the frame border, wherein the substantially entire area of the display image includes portions of the captured image disposed inside and outside of the frame border.

2. The surrounding image display system according to claim 1, wherein the second frame border portion is drawn in at least one of a mode in which at least part of an outer periphery of the first frame border portion is bordered and a mode in which at least part of an inner periphery of the first frame border portion is bordered.

3. The surrounding image display system according to claim 1, wherein the display image is a grayscale image, and the first color and the second color are different in level of gray.

4. The surrounding image display system according to claim 1, wherein the first frame border portion is drawn in a dotted line or broken line, and the second frame border portion is drawn in a clotted line or broken line in cooperation with the first frame border portion.

5. The surrounding image display system according to claim 1, wherein the second frame border portion is drawn at a position offset obliquely on a screen with respect to the first frame border portion, so that a part of the second frame border portion is disposed inside the first frame border portion and another part of the second frame border portion is disposed outside the first frame border portion.

6. The surrounding image display system according to claim 1, further comprising a display that outputs the display image generated by the processor.

7. A surrounding image display method for a vehicle, comprising:
 processing a captured image from a camera, which captures an image around the vehicle, to recognize an attention object;
 generating a display image in which a frame border, which at least partially surrounds the recognized attention object and which includes a first frame border portion drawn in a first color and a second frame border portion drawn in a second color different from the first color, is superimposed on the captured image; and
 flashing by temporarily increasing a brightness of the display image and then returning the brightness of the display image to an original brightness, over a substantially entire area of the display image other than the frame border, wherein the substantially entire area of the display image includes portions of the captured image disposed inside and outside of the frame border.

8. The surrounding image display method according to claim 7, wherein the generated display image is output to a display device.

9. A non-transitory storage medium that stores a computer-readable program that causes a computer to execute the steps of the surrounding image display method according to claim 7.

\* \* \* \* \*